United States Patent [19]
Letemps et al.

[11] Patent Number: 4,966,618
[45] Date of Patent: * Oct. 30, 1990

[54] METHOD AND APPARATUS FOR BENDING AND TEMPERING GLASS PLATES

[75] Inventors: Bernard Letemps, Thourotte; Jacques Leclercq, Roisel; Philippe Dereims, Compiegne, all of France

[73] Assignee: Saint-Gobain Vitrage, Courbevoie, France

[ * ] Notice: The portion of the term of this patent subsequent to Sep. 18, 2007 has been disclaimed.

[21] Appl. No.: 361,355

[22] Filed: Jun. 5, 1989

[30] Foreign Application Priority Data

Jun. 7, 1988 [FR] France ................................ 88 07533

[51] Int. Cl.$^5$ ............................................ C03B 23/033
[52] U.S. Cl. ........................................ 65/106; 65/104; 65/273
[58] Field of Search ................. 65/351, 273, 107, 104, 65/106

[56] References Cited
U.S. PATENT DOCUMENTS

| | | |
|---|---|---|
| 2,308,062 | 12/1953 | Drake .................................. 65/268 |
| 2,560,305 | 1/1956 | Ramain . |
| 3,782,916 | 1/1974 | Powell et al. ..................... 65/273 X |
| 4,540,426 | 9/1985 | Bocelli et al. ........................ 65/273 |

Primary Examiner—Joye L. Woodward
Attorney, Agent, or Firm—Oblon, Spivak, McClelland, Maier & Neustadt

[57] ABSTRACT

A bending installation includes a shaping bed, an evacuation conveyor positioned downstream of the shaping bed and a swinging device for swinging a glass plate exiting the downstream end of the shaping bed from the shaping bed to the evacuation conveyor. The shaping bed is curved in a direction of advance of the glass plate and has a conveying direction different from that of the evacuation conveyor. The swinging device takes the form of a rotating drum mounted coaxially with a support roller. The drum includes holding rollers spaced from the support roller by a distance sufficient that a glass plate exiting the shaping bed is held between a holding roller and the support roller, so that the swinging device is swung by the weight of the glass plate to a position where the glass plate is transferred to the evacuation conveyor. A tempering air blowing box may be provided on the swinging device.

11 Claims, 4 Drawing Sheets

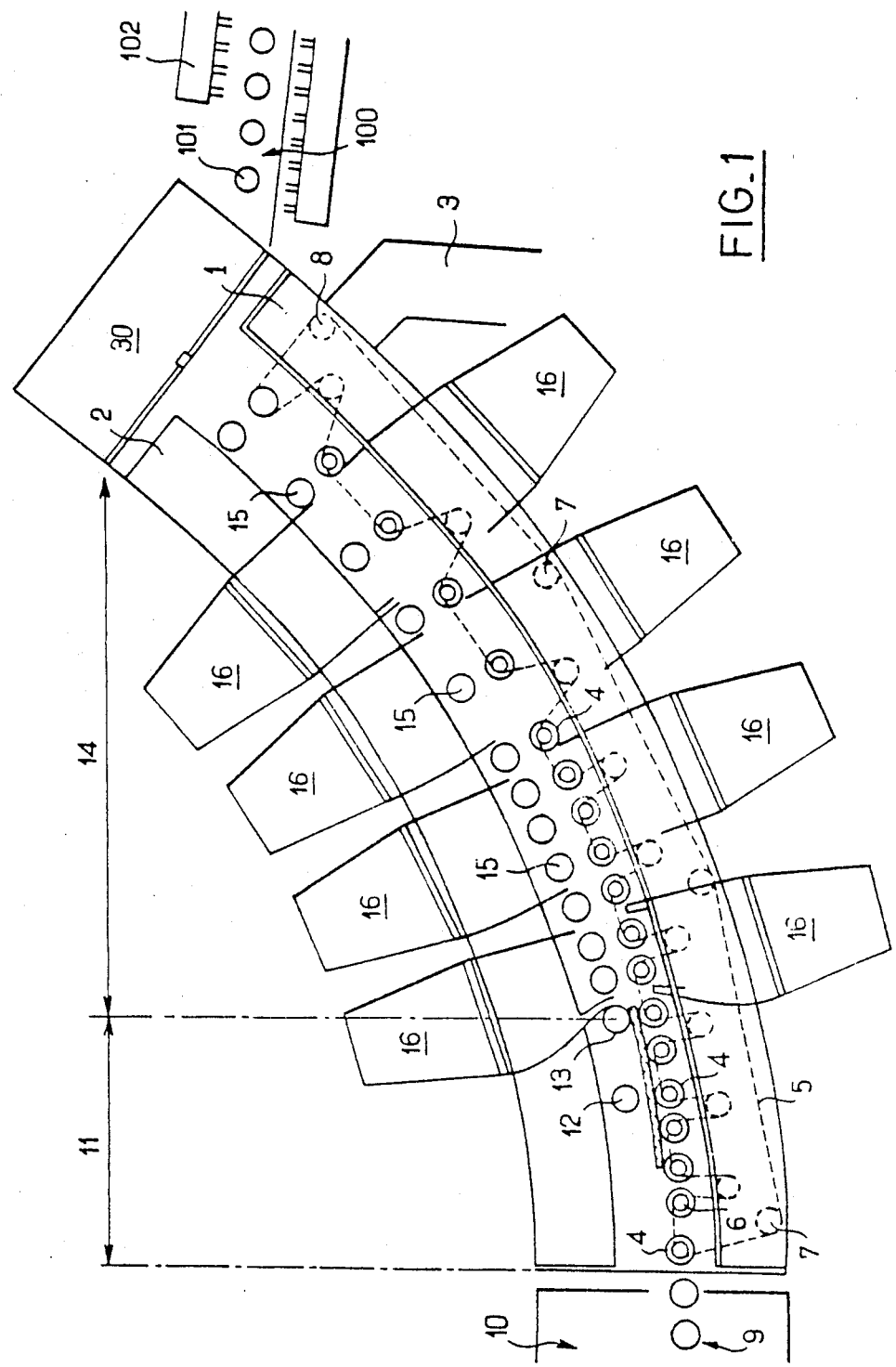

FIG._2A
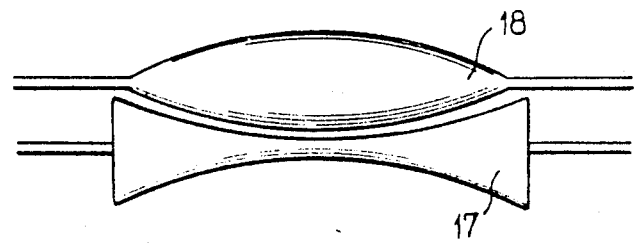
FIG._2B
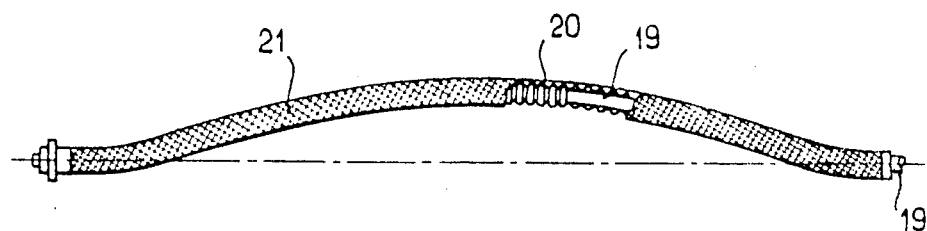
FIG._2C
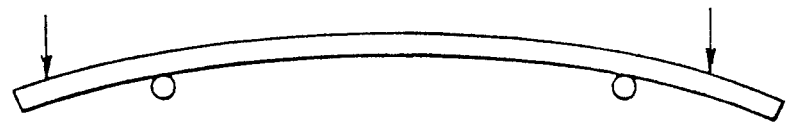
FIG._2D

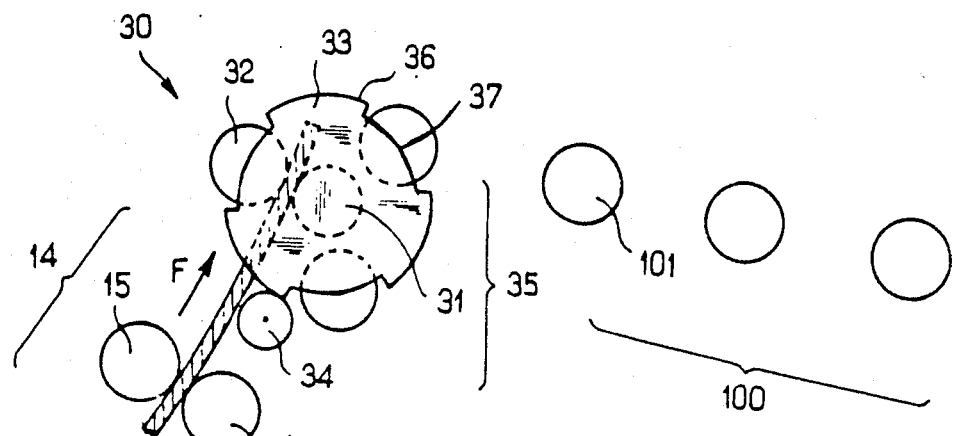
FIG_3A
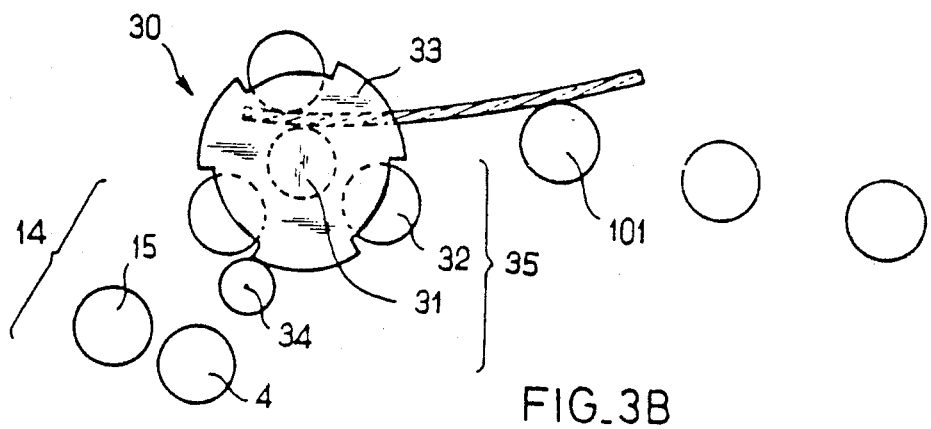
FIG_3B
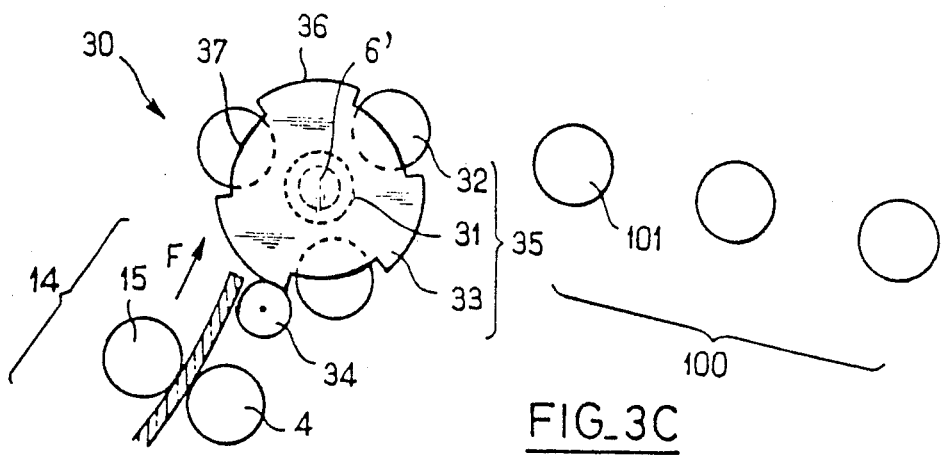
FIG_3C

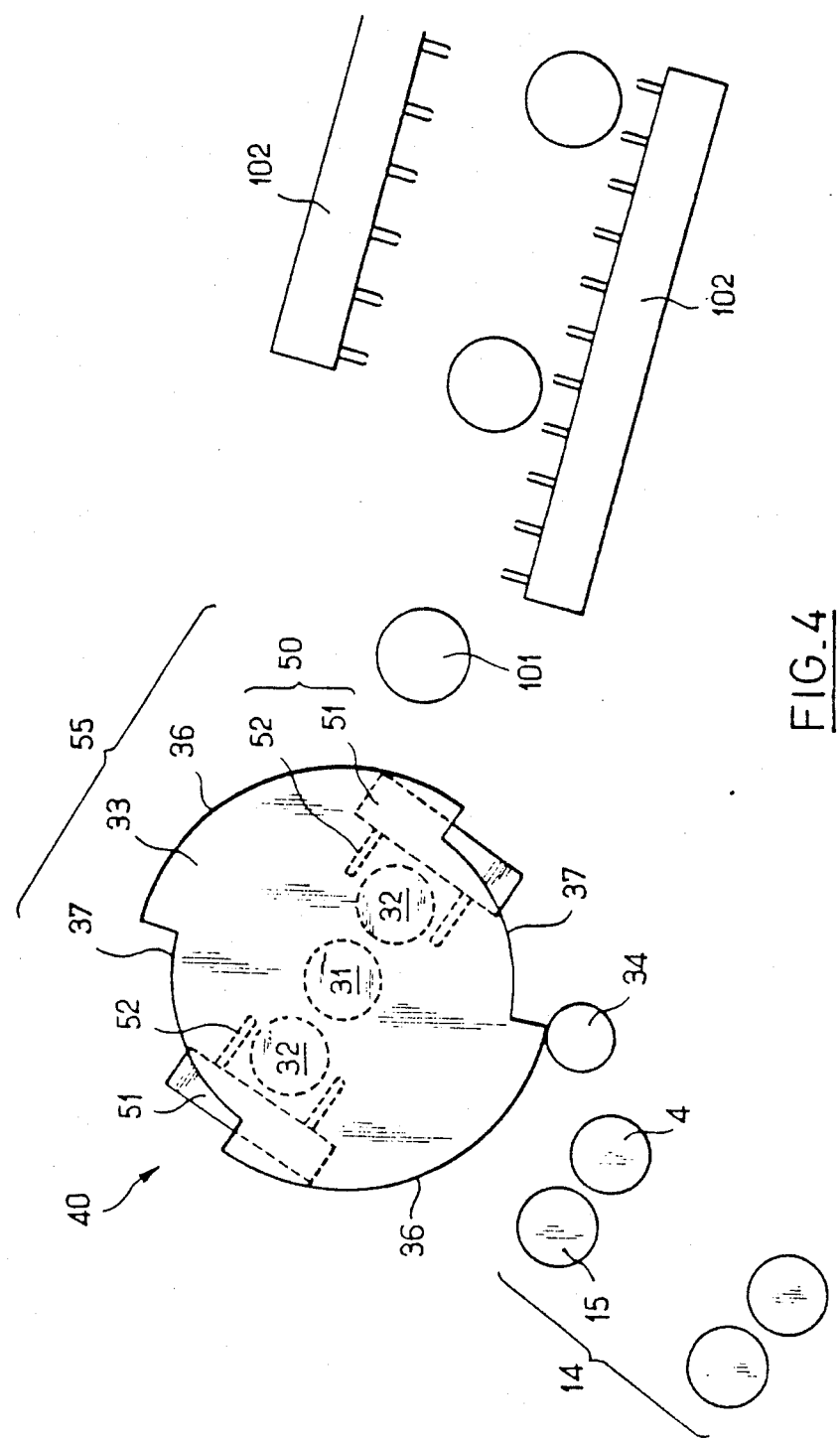

METHOD AND APPARATUS FOR BENDING AND TEMPERING GLASS PLATES

BACKGROUND OF THE INVENTION

1. Field of the Invention:

This invention relates to bending glass plates and optionally also their tempering, and it relates more particularly to an installation for bending and optionally tempering in which said glass plates are bent by being transported on a conveyor whose elements of support of the glass plates are placed along a curved path.

This bending technique, optionally including heat tempering, is more particularly described in French Pat. document No. 2 422 219, U.S. Pat. No. 4 540 426 and European Pat. document No. 263 030. In these documents, conveyors with rectilinear rollers are described whose axes form a curved path, descending or preferably rising. These conveyors are able to give glass plates brought to their bending temperature, and therefore deformable under the effect of gravity, a simple bend, i.e. in a single direction, or a cylindrical bend, when they pass on these conveyors. Conveyors with curved rollers or rods are also described whose axes form, as before, a curved path, thus constituting for the glass plates thereon heated to bending temperature, a double bend shaping bed to produce both a bend in the direction of travel of the glass plates by the arrangement of the rollers or rods in the curved path, and a crosswise bend in the direction perpendicular to the direction of travel, by the curved shape of the rollers or rods.

U.S. Pat. No. 4,540,426, already cited, also proposes a recovery of the glass plates at the upper end of the bending and tempering device with a curved profile in the direction of advance of the glass plates. This recovery is performed by a swinging device in which each glass plate engages at the end of the bending and tempering operation. The device swings under the projection effect created by the weight of the glass plate and deposits the plate on a conveyor which does not have a greatly tilted inclined orientation of the end of the bending and tempering device, but has a different orientation such as approximately horizontal. After having swung each glass plate onto the evacuation conveyor, the swinging device freed from the projection created by the glass plate returns by swinging in the opposite direction to its initial position, waiting for the next glass plate.

This swinging device is generally satisfactory, but the swinging time in the opposite direction to return to receiving position for a new glass plate is essentially troublesome because it limits the rate of this bending-tempering technique. Actually, according to this technique, the glass plates could follow one another at a higher rate, practically without intervals between them, if there were no need to await the return of the swinging device to its receiving position.

SUMMARY OF THE INVENTION

An object of the present invention, therefore, is to eliminate this speed limitation introduced by the swinging device for the recovery of glass plates at the output of the bending-tempering installation, so as to be able to benefit without restriction from the capabilities of this bending-tempering technique of glass plates on a shaping bed with a curved profile in the direction of advance of the glass plates.

Further, the swinging device for the recovery of glass plates is, according to U.S. Pat. No. 4,540,426, already cited, placed after the tempering zone, which therefore requires a time of passage through said swinging device which is devoted solely to the swinging, during which the processing of the glass plates, i.e., bending or tempering, does not advance, which adds to the bending and tempering treatment time.

Advantageously, to improve the bending and tempering of glass plates in a shaping bed with a curved profile in the direction of advance of the glass plates, the invention has as another object to compress or eliminate this time of dead passage through the swinging device reserved solely for the recovery of glass plates and during which they are not processed.

The above, and other objects are achieved according to the present invention by a bending installation comprising a shaping bed having means for supporting and shaping a heated glass plate moving in a conveying direction along the shaping bed, the shaping bed being curved in the conveying direction, an evacuation chamber positioned downstream of the shaping bed in the conveying direction and having a conveying direction non-coplanar with the conveying direction of the shaping bed at a downstream end of the shaping bed, and swinging means for swinging a glass plate exiting the downstream end of the shaping bed from the conveying direction of the downstream end of the shaping bed to the conveying direction of the evacuation chamber. The swinging means includes a rotatable glass plate support element aligned with, and immediately downstream of, the means for supporting and shaping, a plurality of holding means mutually spaced about the axis of the support element, the holding means being rotatable about axes extending parallel to the axis of the support element, the axes of the holding means being rotatable together as a drum about the axis of the support element and independent of the rotation of the support element. The holding means are each spaced from the support element such that a glass plate exiting from the downstream end of the shaping bed is held between the glass plate support element and one of the holding means when the axes of the holding means are rotated to a receiving position in which the space between the support element and the one of the holding means is aligned with the glass plate exiting the downstream end of the shaping bed. The weight of the glass plate thus rotates the drum to a drive position in which the glass plate is swung to the conveying direction of the evacuation conveyor. Means are also provided for periodically driving the drum defined by the axes of the holding means from the drive position to a new receiving position in which the space between the support element and another one of the holding means is aligned with another glass plate exiting the downstream end of the shaping bed.

According to a further feature of the invention, the driving means comprise a cam fixed to the axes of the holding means, wherein the holding means and the cam together comprise the drum, and a drive roller engageable with the cam portions of the cam when the drum is at the drive position. The cam preferably comprises a disk having notches between the cam portions.

According to a further feature of the invention, there is provided a tempering means in the form of a blowing means for tempering a glass plate held by the swinging means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic elevational view of a bending and tempering installation for which the swinging devices according to the invention are provided;

FIG. 2A shows a rectilinear roller as one of the different support elements useable in the bending tempering installation and the swinging device according to the invention;

FIG. 2B shows curved rods as the support elements;

FIG. 2C shows "twin wheel"/"spindle" type rollers as the support elements;

FIG. 2D shows "camber" rollers as the support elements;

FIG. 3A shows the swinging device at the time of the receiving of a glass plate;

FIG. 3B shows the swinging device during swinging;

FIG. 3C shows the device during the rotation in repositioning for a new receiving phase; and FIG. 4 shows a swinging device according to the invention with two receiving positions, equipped with blowing means.

DETAILED DESCRIPTION OF THE PREFERRED EMBODIMENTS

FIG. 1 shows an installation of bending and tempering of glass plates to which the swinging devices according to the invention are provided. It has two frame elements 1 and 2, a lower element 1 and an upper element 2, curved in the direction of their length and carried by a frame 3.

Lower element 1 is equipped with elements 4 supporting the glass, such as straight rollers placed parallel to one another in the width direction of the installation. These elements 4 rotate about fixed axes and are driven by a chain 5 acting on pinions 6 placed at the end of the rollers. The chain 5 is kept taut with the assistance of tension and return pinions 7, driven from a drive shaft 8. Elements 4, in particular the straight rollers placed one after another, define a shaping bed for the glass plates with a curved profile in the conveying direction of a glass plate which exits from feeding conveyor 9 of a glass heating furnace 10. Preferably, the shaping bed thus constituted is aligned with conveyor 9 so as to offer to the glass plates a continuous path, that is a regular path without jerks, breaks or jumps.

Upper element 2 is equipped, at least in some parts, with upper means for holding the glass plates such as rollers 15. Advantageously, as shown in FIG. 1, such rollers 15 do not exist in a first zone 11 where the bending is carried out; there optionally can exist in zone 11 means such as rollers 12 spaced at a distance relative to lower elements 4. The rollers 12 intervene only by way of safety, i.e., the glass plates passing on lower elements 4, if they bend themselves normally on the shaping bed and assume the shape of the bed, do not touch the rollers 12. At the edge of bending zone 11, just before a second, tempering zone 14, frame 2 is equipped with roller 13 as a means for assisting the advance of glass plate and making a barrier to the penetration of the tempering air into the bending zone. If lower elements 4 are rectilinear rollers (FIG. 2), the roller 13 should be of the same type, placed so as to be in contact with the upper face of the glass plates opposite lower roller 4 at the downstream end of bending zone 11, and driven at the same speed as lower rollers 4.

In tempering zone 14, which immediately follows bending zone 11, there are placed support elements 4, upper holding means (i.e., rollers 15), in contact with the glass and resting on it. Elements 4 and rollers 15 are of the same nature as elements 4 of zone 11, namely rectilinear rollers if rectilinear rollers constitute elements 4 of zone 11. In this zone 14 there are also placed blowing nozzles 16 intended to blow a cooling gas, generally air, on the glass to temper it. These nozzles 16 are placed so as to blow the cooling gas on both the lower face and the upper face of the glass.

The evacuation of the glass plates at the end of the installation part described previously is achieved by a swinging device 30. This 30 feeds the glass plates to a conveyor 100 having a conveying direction different from that of the installation immediately upstream from device 30. More precisely, immediately before device 30, the glass plates are in an inclined position, at times greatly inclined, whereas conveyor 100 has a horizontal or approximately horizontal position.

If support elements 4 of bendinq zone 11 and tempering zone 14 are rectilinear rollers, conveyor 100 itself also consists of rectilinear rollers 101 or equivalent elements (rollers, gas cushions, etc...).

In the installation described above, the glass plates acquire a simple bend, i.e. in a single direction, in the direction of their passage by their sagging on the shaping bed with a curved profile in the longitudinal direction.

An installation of the same type can be provided to give the glass plates, in addition to their bend in the direction of their passage, a bend in the crosswise direction. In this case support elements 4 and rollers 12, 13 and 15 are modified consequently. For example, the rollers may be of the "twin wheel" type 17 and "spindle" type 18 (FIG. 2B), i.e. noncylindrical but having profiled shapes in which case lower elements 4 and upper rollers 15, 13 and optionally 12, have complementary shapes.

There may also be used curved rods or rollers, having (as shown in FIG. 2C) a non-rotatable curved rigid central core 19, covered by a ringed tubular sheath 20 which rigid in rotation but axially deformable, covered by a rotatably driven protective device 21 of braided or knitted glass or silica fibers. These curved rods or rollers are described more fully in French Pat. document Nos. 1 476 785, 92 074, 2 129 919, 2 144 523, 2 189 330.

There may also be used curved rollers of another type, for example normally rectilinear rollers 22 curved by the effect of a stress exerted on their ends. These rollers are generally called "cambers" and are illustrated in FIG. 2D.

Conveyor 100 is also adapted to the type of bend of the glass plates to be transported and its elements supporting the glass plates will be of the same type as those installed in bending and tempering zones 11 and 14.

Swinging device 30 is, for example, of the type shown in FIGS. 3A, 3B and 3C.

These FIGS. 3A, 3B and 3C all show the last pair of upper holding rollers 15 and support elements 4 at the end of tempering zone 14, and the first support elements 101 of horizontal or approximately horizontal conveyor 100.

As already said, these rollers 15, elements 4 or elements 101 can be, depending on the type of bend desired for the glass plates, rectilinear rollers or curved rollers, camber rollers, or profiled rollers.

To simplify the description of swinging device 30, we will take the example of a bending-tempering installation intended to produce glass plates having only a simple bend, it being understood that the invention is not limited to this single embodiment, but that it also applies to installations making it possible to produce glass plates with a double or complex bend.

The swinging device generally referenced as 30, essentially consists of a central support element, e.g., support roller 31, multiple identical associated holding means, e.g., holding rollers 32 evenly distributed around central support roller 31. Each of the holding rollers 32 is spaced from roller or element 31 so as to make possible the engagement of a glass plate between the two. Each roller 32 rotates about an axis extending parallel to the axis of the support roller 31. The axes of the holding rollers 32 together rotate about the axis of roller 31 in a rotating direction so as to form a drum like shape. There are also provided means for periodically driving the drum defined by the holding rollers of the swinging device in rotation in the rotating direction. Central support element 31 turns independently of the rotation of the drum and at the same speed as support elements 4 of the preceding zones 11 and 14. Advantageously the chain 5 that drives the rollers of zones 11 and 14 also engages on a pinion 6' located at the end of central support element 31.

The drum, including the element 31 and at least one cam 33, is referenced overall as 35, and is able to turn around the axis of support roller 31 in the rotating direction, independently of the rotation of this roller 31.

For example, the cam 33 may be mounted to one end of a spyder (not shown) rotatable about the axis of roller 31 and having rollers 32 journalled thereon.

The driving means for rotatably driving of drum 35 can be obtained, as shown in FIGS. 3A-3C, thanks to the cam 33 integral with support element 31 and associated holding rollers 32. Cam 33 is intermittently driven for rotation in the rotating direction by at least one drive roller 34. The drive roller 34 is, for example, moved by chain 5 which drives support rollers 4 or by an additional chain driven by the same drive shaft 8 or by another independent drive shaft.

In this embodiment, the driving periodicity is obtained by the fact that cam 33 exhibits a contour having so-called "active" zones 36 able, when they align with roller 34, to be in contact with it, thereby rotatably driving drum 35, and so-called "inactive" zones 37 which, even when they are aligned with roller 34 are not in contact with it, which means that drum 35 is not driven at this time. Cam 33 may be a circular disk placed at the end of rollers 31 and 32 and extending perpendicular to them; active zones 36 consist of portions of circumference of radius R and the inactive zones 37 consist of portions of circumference of radius r less than R, which constitutes on the disk of cam 33 a series of notches or scallops.

Active parts 36 and inactive parts or scallops 37 are arranged so that drum 35 is driven in rotation in the rotating direction from a drive position that it has after having swung a glass plate on conveyor 100, to a receiving position in which central support roller 31 and one of holding rollers 32 which are associated with it in drum 35, are aligned with and ready to receive a new glass plate at the end of the shaping bed with curved profile.

The surface of roller 34 and/or cam 33 is of a material of the rubber type which favors the driving of cam 33 by simple contact.

Optionally, roller 34 can be equipped with a torque limiting clutch, i.e. a device assuring its immobility when the resistance to rotation exceeds a predetermined value. Thus when roller 34 is at a drive position at the beginning of the active part, but the glass plate already resting on evacuation conveyor 100 is not yet totally disengaged from support roller 31 and holding roller 32 so that the rotation of drum 35 is blocked, the torque limiting clutch intervenes.

To avoid the use of a torque limiting clutch, inclined ramps can be provided at the borders between an inactive zone 37 to an active zone 36, making possible the gradual engagement of roller 34, and its slipping, as long as the resistance to the rotation exists.

Other means being able periodically to drive drum 34 in rotation are possible. Thus roller 34 can be equipped with a motor or, more generally, by a driving means put into operation only periodically. In this case, the cutouts of the cam to produce active portions 36 and inactive portions 37 are unnecessary. Thus the drum also can have its own motor, put into operation periodically.

To obtain the best output from the installation so that the time of bringing the drum into a receiving position is as short as possible, it is essential that the rotation of drum 35 necessary for it to come into the drive position after having delivered a glass sheet be the smallest possible angle of rotation. The case where no additional rotation is necessary is ideal, but it must correspond both to the very particular respective positions of the shaping bed and evacuation conveyor 100 as well as to a distribution of holding means 32 around support element 31 corresponding to these respective positions.

In FIGS. 3A-3C, the construction shown comprises 3 holding rollers 32 regularly distributed on the periphery of central support roller 31, and cam 33 comprises three active parts 36 separated in pairs by inactive parts 37.

Holding rollers 32 are mounted at a predetermined distance relative to central support roller 31 this distance corresponding to the thickness of the glass plates to be treated and being adjustable to adapt to various possible glass thicknesses.

A drum 35 having only two holding rollers 32 is possible and the possible number of holding rollers can be higher, i.e., more than three. Advantageously, holding means 32 are distributed regularly around central support element 31 but this is not necessary.

The device shown in FIGS. 3A-3C operates in the way described below.

As shown in FIG. 3A, when waiting for a glass plate advancing in the bending-tempering installation in the curved shaping bed, first in bending zone 11 then in tempering zone 14, drum 35 of the swinging device is positioned in a receiving position such that one of the spaces separating central support roller 31 from a holding roller 32 is aligned with an extension of the corresponding spaces located upstream in zone 14. During this time, drum 35 is not rotated and for this purpose drive roller 34 does not act on cam 33, i.e., it is aligned with the beginning of an inactive scallop 37. The glass plate is inserted at its front edge between support roller 31 and opposite holding roller 32 placed in a receiving position. Driven by lower support rollers 4 of the tempering zone, by support roller 31 and optionally by upper holding rollers 15, the glass plate advances according to the conveying direction shown by arrow F in swinging device 30, the latter remaining immobile.

When the rear edge of the glass plate is freed from the unit consisting of last lower roller 4 of zone 14 and the associated last upper roller 15, drum 35 is free to swing, which it does when the part of the glass plate having gone beyond roller 31 and roller 32 is sufficient for its weight to turn the device. The device turns in the rotating direction until the glass plate rests on evacuation conveyor 100. During this rotation which is carried out solely under the effect of the weight of the glass, cam 33 turns from the inactive scalloped part 37 opposite the beginning of which is located roller 34 before the rotation, to a drive position in which the beginning of an active part 36 of cam 33 is now opposite drive roller 34. This is illustrated in FIG. 3B. Until the glass plate is totally clear of the two rollers of support 31 and holding 32, roller 34 slips on the beginning of active part 36 where the torque limiting intervenes. Then as soon as the glass plate is freed, there is no longer any brake to the rotation of the drum and the latter is driven in the rotating direction by roller 34 until this roller 34 reaches, after having rolled over an entire active sector 36, the beginning of a new inactive sector 37. This new receiving position is illustrated in FIG. 3C.

It is found that the angle turned by drum 35 to pass from the position illustrated in FIG. 3B to the position of FIG. 3C is on the order of only about 50 degrees and therefore that the time to turn by this angle is small and much less than the time needed if the swinging device had been equipped only with a single receiving station.

An appreciable time gain results from this, which allows the forwarding of glass plates in the bending-tempering installation practically without pause.

Advantageously, in a bending-tempering installation equipped with a swinging device with several receiving positions as described above, the invention further proposes the blowing of gas concurrent with the tempering during the passage of glass plates in the swinging device and advantageously putting the blowing means in the swinging device.

The above swinging devices may be equipped with blowing means. However, due to the resulting complexity, the swinging devices further having blowing means preferably have only two receiving positions; optionally three but rarely more.

FIG. 4 shows a swinging device 40 with two receiving stations, further equipped with blowing means.

The elements described above are also found here, namely a central support element 31, upper holding means 32, a cam 33, a driving roller 34.

As already said, the support elements and the holding means can be curved, or exhibit profiled shapes, but in the most simple and most frequent case where it is sought to give only a simple bend to the glass plates, these holding elements 31 or means 32 are rectilinear rollers, but may take other forms.

In addition to the elements described above, swinging device 40 has blowing means 50 essentially comprising boxes 51, preferably equipped with nozzles such as 52, fed with blowing gas—each holding roller 32 thus is covered by a box 51. All boxes 51 are mounted on the face of the disk which constitutes cam 33 and extend parallel to rollers 31 and 32 approximately over the entire length of the rollers 31. This unit of support roller 31, holding rollers 32, boxes 51, cam 33 constitutes a drum 55 able to turn independently of rollers 31 and 32, around the same axis as roller 31.

Advantageously to stiffen drum 55, a flange or a second cam, not shown, is provided at the opposite end of drum 55. This second cam may be fixed to the other end of the spyder (not shown) to which the axes of the rollers 32 are journalled.

Thus in the swinging device according to the invention equipped with several receiving stations and further equipped with blowing means, the glass plate is subjected to the cooling of the gas coming from nozzles 52 of boxes 51 placed opposite each of its faces and whose plane of the outlet orifice of the nozzles is approximately parallel to said faces, as soon as it penetrates into the swinging device and during the entire time it is present in said device.

There therefore results, thanks to this additional blowing means, either a longer blowing time or a longer blowing length. This therefore allows either the shortening of portion 14 reserved for blowing in the stationary part of the installation, or a higher passage rate of the glass plates in the installation.

Further, again to improve the performance of the installation, cooling means 102 also can be placed along evacuation conveyor 100. The tempering is thus carried out in zone 14 with curved profile and optionally in swinging device 55, and a secondary cooling continues along conveyor 100.

Cooling means 102, when they are present in lower position along conveyor 100, can also have a role of damping the glass plate during its landing on said conveyor 100. Cooling means 102 can be placed only in lower position along conveyor 100, therefore blowing only on the lower face of the glass plates, but advantageously they are also placed in upper portions to simultaneously blow on the upper face of the glass plates.

As a variant, to avoid encumbering the swinging device with blowing means which turn at the same time as it does, in particular when the number of receiving positions is considerable, the invention makes provisions for blowing means at or beyond the stationary blowing means, independent of the swinging device but placed nearby and blowing on the glass plates while they advance in said swinging device.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A bending installation comprising:
   a shaping bed having means for supporting and shaping a heated glass plate moving in a conveying direction along said shaping bed, said shaping bed being curved in said conveying direction;
   an evacuation conveyor positioned downstream of said shaping bed in the conveying direction, and having a conveying direction non-coplanar with the conveying direction of said shaping bed at a downstream end of said shaping bed; and
   swinging means for swinging a glass plate exiting the downstream end of said shaping bed from said conveying direction to the downstream of said shaping bed to said conveyor direction of said evacuation conveyor, comprising:

a rotatable glass plate support element having an axis aligned with, and immediately downstream of, said means for supporting and shaping, a plurality of holding means mutually spaced about the axis of said support element, each of said holding means having an axis of rotation extending parallel to the axis of said support element, said holding means being rotatable together as a drum about the axis of said support element and independent of rotation of said support element, said holding means each being spaced from said support element such that a glass plate exiting the downstream end of said shaping bed is held between said glass plate support element and one of said holding means when said drum is rotated to a receiving position wherein the space between said support element and said one of said holding means is aligned with the glass plate exiting said downstream end of said shaping bed, whereby the weight of a glass plate rotates the drum in a rotating direction to a drive position in which the glass plate is swung to the conveying direction of said evacuation conveyor; and means for periodically driving said drum in said rotating direction from said drive position to a new receiving position wherein the space between said support element and another one of said holding means is aligned with a glass plate exiting said downstream end of said shaping bed.

2. The bending installation of claim 1 wherein said driving means comprise:

a cam fixed to said axes of said holding means wherein said holding means and said cam together comprise said drum; and a drive roller engageable with a cam portion of said cam when said drum is at said drive position.

3. The bending installation of claim 2 wherein said cam comprises a disk having at least two cam portions with notches between said cam portions.

4. The bending installation of claim 2 including tempering means for tempering a glass plate held by said swinging means.

5. The bending installation of claim 4 wherein said tempering means is mounted on said drum.

6. The bending installation of claim 5 wherein said evacuation conveyor further includes tempering means.

7. The bending installation of claim 5 wherein said tempering means comprises blowing means for blowing air onto both sides of the glass plate held by said swinging means.

8. The bending installation of claim 7 wherein each of said blowing means comprises a blowing box associated with one of said holding means.

9. The bending installation of claim 7 wherein said blowing means are stationary and positioned adjacent said swinging means.

10. The bending installation of claim 1 wherein said support element comprises one from the group consisting of a rectilinear roller, a curved rod having a rotating ringed tubular sheath, a camber roller and a shaped roller having a shape complementary to a shape of said holding means.

11. A process for receiving glass plates in a bending and tempering installation, comprising the steps of:

discharging a glass plate in a conveying direction from a bending and tempering means into a swinging means;

swinging the discharged glass plate by swinging the swinging means from said conveying direction of said bending and tempering means to a non-coplanar conveying direction; and returning said swinging means to a position for receiving another glass plate from the bending and tempering means by swinging said swinging means about an angle less than an angle swung in the swinging step, whereby the swinging means may rapidly receive another glass plate.

* * * * *